United States Patent Office 3,527,985
Patented Sept. 8, 1970

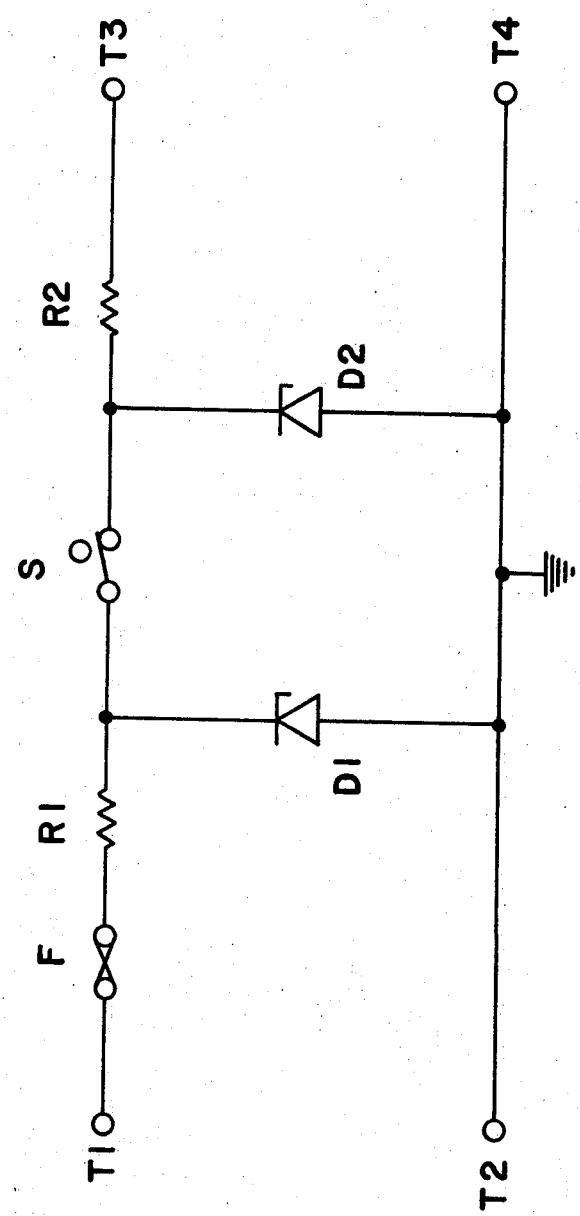

---

3,527,985
ELECTRICAL BARRIER DEVICE
Kenneth John Brown, Oxted, England, assignor to The Foxboro Company, Foxboro, Mass., a corporation of Massachusetts
Filed Oct. 27, 1967, Ser. No. 678,707
Claims priority, application Great Britain, Dec. 2, 1966, 54,195/66
Int. Cl. H02h 7/00
U.S. Cl. 317—16                    8 Claims

ABSTRACT OF THE DISCLOSURE

An electrical barrier device in an electrical conductor isolates a safe area from a hazardous area; the barrier device includes Zener diodes both connected to an electrical reference and arranged to be effectively placed in parallel by a normally closed switch serially disposed in said electrical conductor, so that a condition causing a dangerous voltage will result in the by-pass of current through said Zener diodes, opening said switch permits Zener diode testing by the application of a test current to either Zener diode.

---

This application claims the priority date of Dec. 2, 1966 accorded British application No. 54,195/66, provisionally filed on that date, with the complete specification in due course having been thereafter filed on Sept. 19, 1967, the material in the present application corresponding to that in that complete specification.

The British complete patent specification was published on Nov. 13, 1968 and given Pat. No. 1,133,750.

This invention relates to electrical barrier devices for use in electrical circuits.

There is increasing use in the petroleum and chemical industries of electrical systems consisting of a passive instrument in the plant area connected by cable to a power source and measuring and control instruments in a control room. In many cases the field equipment is situated in areas where inflammable gases or vapours constitute a hazard and it is necessary to take precautions to ensure that not only is it safe in normal operation but that in the event of a fault condition arising in the power source or receiving instruments in the safe area, the amount of energy which may be transmitted through the cables to the field equipment is sufficiently small that it cannot cause ignition.

According to the invention, an electrical barrier device to be interposed in an electrical conductor between a safe area and a hazardous area, to control the aforesaid energy, includes a normally closed switch to be opened at will by a field effect, such as that of a magnetic field, and arranged to be inserted in the conductor for the purpose of testing the device, two Zener diodes connected respectively to two points, between which the switch is interposed, and arranged to be connected in parallel to earth, or to an equivalent conductor, and a resistor in series with the said two points on the side thereof to be connected to the hazardous area, the Zener diodes being installed to remain in a substantially non-conducting condition while a predetermined safe current, depending on the source voltage and the total loop resistance, is passing through the conductor, but to bypass current in the event of a dangerous voltage arising in the safe area, and the arrangement being such that the Zener diodes may be tested after disconnecting the device from the working circuit by opening the switch and passing current through the conductor from opposite ends. Preferably the switch is a reed switch operable by a magnetic field. Advantageously, also, a fuse is provided between the safe area side and the junction of one Zener diode and the reed switch to prevent the Zener diodes from being damaged by a heavy current surge.

In order that the invention may be clearly understood and readily carried into effect, a barrier device in accordance therewith will now be described, by way of example, with reference to the accompanying drawings which is a circuit diagram.

The device shown in the figure consists of a fuse F, two resistors R1, R2, a reed switch S which is normally closed, and two Zener diodes D1, D2, which have the property that, within certain limits, the potential developed across them is virtually independent of the current flowing through them. The device is permanently encapsulated in an insulating material.

The invention is used specifically with a system in which a direct current power source and a number of receiving instruments are connected together in series in the safe area and in which an element in the field, responsive to a pressure or differential pressure input, acts as a variable resistance to control the current to a value proportional to an input signal. The current is, within limits, sensibly independent of the resistance in the circuit. As the system is a series one there are only two conductors between the safe area and the field element. When the device is used, one of these conductors passes directly through it from terminal T2 to terminal T4 and is connected to earth at the device by a substantial conductor. The other conductor passes from the safe area equipment to a terminal T1 and from a terminal T3 to the field element.

The direct current power source to the system is such that in normal operation the Zener diodes are in a virtually non-conducting condition and the device presents only a resistance to the flow of current through the circuit determined by the resistance of the fuse and of the resistors R1, R2. The voltage is selected so that this resistance can be accepted without interference to the normal operation of the system.

In the event of a fault condition arising in the safe area which connects an excessive voltage relative to earth to terminal T1, current passes through the fuse and the resistor R1 and some is by-passed to the earth return by way of the Zener diodes, now in a conducting condition. The voltage across the Zener diodes being determined by their selection and being relatively insensitive to the magnitude of the current passing through them, a controlled current determined by the Zener voltage and the magnitude of the resistor R2 flows in the field circuit. The resistor R2 is selected so that the current in the worst condition (an intermittent short circuit of the field leads in the danger area) is limited to a value which is lower by a certain safety factor than the minimum which is known to be able to cause ignition.

The function of the resistor R1 is to limit the value of input current to the device in the worst foreseen fault condition (with 250 v. R.M.S. A.C. or 350 v. D.C. on terminal T1) to a value which brings it within the known surge current-surge duration characteristic curve of the fuse F and the Zener diodes D1, D2 to ensure that the fuse protects the Zener diodes under all foreseen fault conditions.

It is essential that care be taken to make the device as reliable as possible. It is for this reason that two nominally identical Zener diodes are used which are effectively in parallel during normal operation. In order to maintain greatest security it is necessary to be able to check the condition of the Zener diodes at intervals. This is made possible by the provision of the reed switch which may be open circuited by a permanent magnet applied to the surface of the device, thus enabling currents to be passed into it from T1 and from T3 to the earth terminals to test independently the Zener diodes D1 and D2 respectively.

A barrier design has been considered in connection with some testing criteria to maintain the leads in the hazardous area safe in the event of accidental application of up to 250 v. A.C. or 350 v. D.C. to the safe area terminals, it being understood that the device is normally intended to operate only with direct current. In this example the component values are as follows:

R1—100 ohms
R2—560 ohms
D1 and D2—100 v. Zener voltage

In order to avoid inaccuracy in the measurement system due to leakage in the Zener diodes, the maximum normal working voltage applied to the system in the safe area is, say, 90 v. The maximum power which may be dissipated in the field-mounted equipment may be taken as a criterion of the capability of the barrier. Maximum power dissipation in the field is achieved when the resistance of the field equipment is equal to that of the source, i.e. the barrier, 660 ohms, and is calculated to be 3.1 w.

In the absence of the switch S, it would be necessary, for the purpose of testing the condition of the Zener diodes from the terminals of the barrier, to reduce the nominal voltage of D2 by about 20% say to 80 v., and to substitute a resistor R3, perhaps to 100 ohms, in place of the switch. The value of R2 could be reduced somewhat because the current through it in a fault condition would now be generated from the lower potential across the diode D2. However, from consideration of the safety of the system in the event of failure of one diode, the value of R2 could not be reduced by more than the value of R3 inserted, so the overall resistance of the barrier could not be less than it was before. It would probably be slightly more.

With the lower voltage rating of D2, the normal working voltage applied to the system would have to be reduced to, say 72 v. Taking the resistance of the barrier without the switch as the same as that of the one with the switch, the new maximum power dissipation would be 2.0 w.

Hence the use of the switch S has in this example increased the power handling capability by more than 50%.

In an earlier proposal (British patent specification No. 977,913) the non-earthed sides of Zener diodes are separated by a resistor and the Zener diodes are of different nominal voltages, the one with the higher nominal voltage being adjacent to a resistor equivalent to the resistor R1. It is possible to check externally the condition of both Zener diodes, but there are two disadvantages to this arrangement. The first is that the intermediate resistance is a hindrance in normal operation and the second is that the voltage of the power supply is limited to that which cannot produce an appreciable leakage current through the lower voltage Zener diode in any normal working condition. The reed switch in the device of the present invention enables higher powers to be handled in the normal state without any degradation of the safety provided under fault conditions.

What I claim is:

1. An electrical barrier for interposition between a safe area and a hazardous area for limiting the amount of energy that can be transferred from the safe area to the hazardous area comprising, two Zener diodes having respective first ends of each connected to an earth ground or an equivalent electrical conductor and having second ends of each connected respectively to first and second circuit points with said Zener diodes adapted to operate below their conducting voltages while a predetermined safe current is transferred from said safe area to said hazardous area, a resistor in series with one of said points and said hazardous area, the other of said points being interconnected with said safe area, and a switch interconnecting said first and second circuit points with said switch being normally closed and being adapted to be opened as desired for testing said Zener diodes individually by passing current through a selected Zener diode by way of one of said first or second points.

2. The electrical barrier of claim 1, with a resistor in series with the other of said two points and the safe area.

3. The electrical barrier of claim 1 with a fuse in series with said safe area and said hazardous area.

4. The electrical barrier of claim 1, in which said switch is a reed switch operable by a magnetic field.

5. The electrical barrier of claim 1, in which the components thereof are encapsulated.

6. The electrical barrier of claim 2 including a fuse serially disposed between said safe area and said hazardous area.

7. The electrical barrier of claim 6 in which said switch is operable magnetically.

8. The electrical barrier of claim 7 in an encapsulated embodiment.

References Cited

UNITED STATES PATENTS

| | | | |
|---|---|---|---|
| 2,876,642 | 3/1959 | Scorgie | 307—318 XR |
| 3,093,777 | 6/1963 | Kroninger | 307—318 XR |
| 3,312,863 | 4/1967 | Muldoon | 317—16 XR |

FOREIGN PATENTS

| | | |
|---|---|---|
| 576,042 | 5/1959 | Canada. |
| 977,913 | 12/1964 | Great Britain. |

OTHER REFERENCES

Silicon Zener Diode and Rectifier Handbook, Motorola, Inc., section 7–9, p. 113, 1961.

WILLIAM M. SHOOP, JR., Primary Examiner

U.S. Cl. X.R.

307—318